(12) United States Patent
Okura et al.

(10) Patent No.: US 7,756,137 B2
(45) Date of Patent: Jul. 13, 2010

(54) METHOD OF CONTROLLING QOS IN IP NETWORK USING ROUTER CONTROL AND MULTI-PATH ROUTING

(75) Inventors: Akihito Okura, Yokosuka (JP); Ken Igarashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1074 days.

(21) Appl. No.: 10/805,410

(22) Filed: Mar. 22, 2004

(65) Prior Publication Data
US 2004/0190527 A1    Sep. 30, 2004

(30) Foreign Application Priority Data
Mar. 24, 2003    (JP) .............................. 2003-081364

(51) Int. Cl.
*H04L 12/28* (2006.01)
(52) U.S. Cl. ................................. 370/395.21; 370/392
(58) Field of Classification Search ............ 370/395.21, 370/392
See application file for complete search history.

(56) References Cited

U.S. PATENT DOCUMENTS

| | | | |
|---|---|---|---|
| 6,324,185 B1 * | 11/2001 | Budhraja .................... | 370/468 |
| 6,650,644 B1 * | 11/2003 | Colley et al. ........... | 370/395.21 |
| 6,671,277 B1 * | 12/2003 | Sugai et al. ........... | 370/395.21 |
| 6,865,153 B1 * | 3/2005 | Hill et al. ................ | 370/230.1 |
| 6,970,930 B1 * | 11/2005 | Donovan .................... | 709/227 |
| 7,237,012 B1 * | 6/2007 | Duncan et al. ............. | 709/217 |
| 2001/0013067 A1 * | 8/2001 | Koyanagi et al. ........... | 709/230 |
| 2002/0044553 A1 * | 4/2002 | Chakravorty ................ | 370/392 |
| 2002/0071434 A1 * | 6/2002 | Furukawa ................... | 370/392 |
| 2002/0114274 A1 * | 8/2002 | Sturges et al. .............. | 370/229 |
| 2002/0131363 A1 | 9/2002 | Beshai et al. | |
| 2002/0141382 A1 * | 10/2002 | Winther et al. .............. | 370/352 |
| 2002/0176131 A1 * | 11/2002 | Walters et al. .............. | 359/118 |
| 2002/0191622 A1 * | 12/2002 | Zdan .......................... | 370/401 |
| 2003/0039210 A1 * | 2/2003 | Jin et al. ..................... | 370/229 |
| 2003/0043802 A1 | 3/2003 | Yazaki et al. | |

(Continued)

FOREIGN PATENT DOCUMENTS

EP    1463248 A2 *    9/2004

(Continued)

OTHER PUBLICATIONS

Francis, Paul; A Near-Term Architecture for Deploying Pip, IEEE Network, May 1993.*

(Continued)

*Primary Examiner*—Ricky Ngo
*Assistant Examiner*—Luat Phung
(74) *Attorney, Agent, or Firm*—Oblon, Spivak, McClelland, Maier & Neustadt, L.L.P.

(57) ABSTRACT

A QoS controller, in an IP network having one or more routers, is disclosed. The controller includes a storing unit configured to assign a first bit area and a second bit area within a field in an IP header of an IP packet. The storing unit stores first bits for controlling the routers into the first bit area and second bits for routing at the routers into the second bit area. A reporting unit is configured to report to the routers the first bits and the second bits stored by the storing unit.

3 Claims, 13 Drawing Sheets

U.S. PATENT DOCUMENTS

| | | | |
|---|---|---|---|
| 2003/0133459 A1* | 7/2003 | Siddiqui et al. | 370/395.21 |
| 2003/0142681 A1* | 7/2003 | Chen et al. | 370/401 |
| 2003/0191853 A1* | 10/2003 | Ono | 709/232 |
| 2004/0190527 A1* | 9/2004 | Okura et al. | 370/395.21 |

FOREIGN PATENT DOCUMENTS

| | | |
|---|---|---|
| EP | 1783969 A1 * | 5/2007 |
| JP | 2000-232480 | 8/2000 |
| JP | 2002-141945 | 5/2002 |

OTHER PUBLICATIONS

E. Crawley, et al., "RFC 2386: A Framework for QoS-based Routing in the Internet.", Network Working Group, XP-002219363, Aug. 1998, pp. 1-37.

S. Blake, et al., "An Architecture for Differentiated Services", Informational RFC 2475, Dec. 1998, pp. 1-32 (http://www.ietf.org/rfc/rfc2475.txt).

J. Moy, "OSPF Version 2" Standards Track RFC 2328, Apr. 1998, pp. 1-191 (http://www.ietf.org/rfc/rtc2328.txt).

J. Moy, "OSPF Version 2", RFC 1583, Mar. 1994, pp. 1-189 (http://www.ietf.org/rfc/rfc1538.txt).

Takeshi Nishida, "Protocols realizing QOS have been Developped Successively Aiming at the Post of TCP/IP", Nikkei Electronics, No. 583, Jun. 14, 1993, 19 pages (with Partial English Translation).

Takeshi Nishida, "Looking for Winning Position of Post-TCP/IP, Continued Development of Protocol Playing Role in Realizing QOS", Nikkei Electronics, No. 583, Jun. 14, 1993, 1 page (submitting partial English translation only, reference previously submitted on Sep. 20, 2006).

* cited by examiner

IP NETWORK (a)    (b)

| TRAFFIC TYPE | ROUTER-CONTROL CLASS | MULTI-PATH ROUTING CLASS |
|---|---|---|
| Traffic_a | Class_a | Routing_1 |
| Traffic_b | Class_b | Routing_2 |
| Traffic_c | Class_c | Routing_1 |
| Traffic_d | Class_d | Routing_1 |

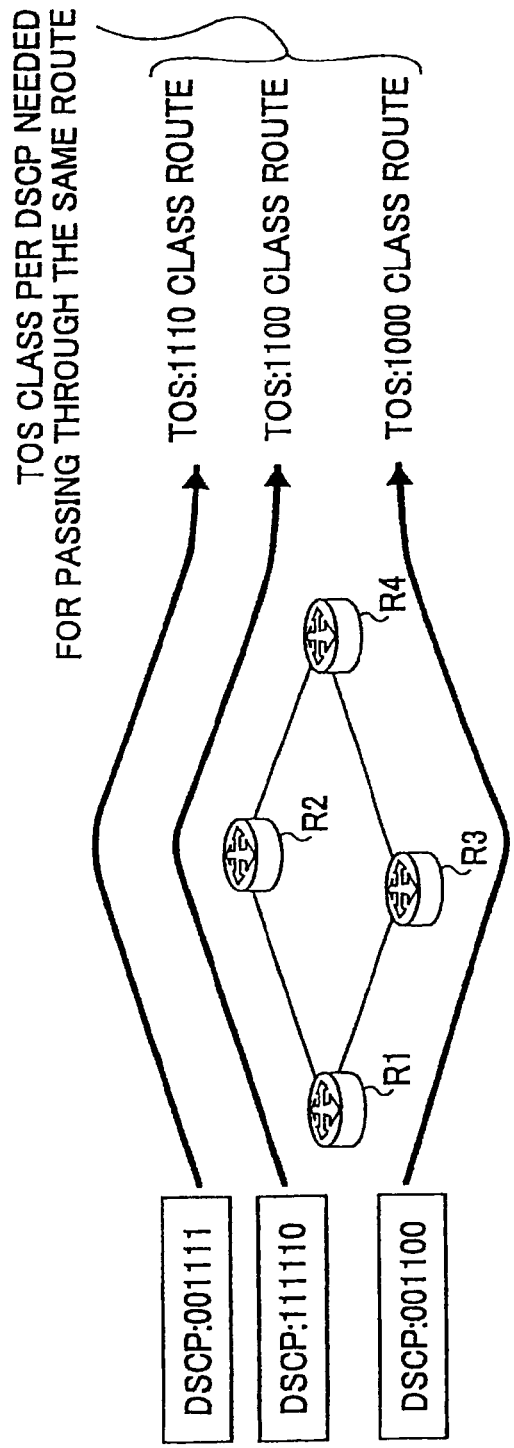

RELATED ART

METHOD OF CONTROLLING QOS IN IP NETWORK USING ROUTER CONTROL AND MULTI-PATH ROUTING

BACKGROUND OF THE INVENTION

1. Field of the Invention

The present invention generally relates to an IP network, and particularly relates to a Quality-of-Service (QoS) controller, a method of controlling QoS, a router, and a QoS control system in an IP (Internet Protocol) network.

2. Description of the Related Art

With network speed increasing in recent years, a demand on the Internet for transferring with high quality such continuous media as voice and video is rapidly increasing. However, as major services provided via the Internet today are of best-effort type, transferring with such high quality as described above may not necessarily be guaranteed for multimedia information having a real-time property (or real-time application).

Thus, for providing a service according to the type of data flowing over the Internet, DiffServ (Differential Services) is known as a technology for providing quality of network service, or QoS (Quality-of-Service) (for example, as described in the Non-Patent Document 1). DiffServ, a technology in which a router performs priority control of traffic based on the quality class of packets, by having to identify a class identifier written in the header of each IP packet, enables priority control according to class.

In this DiffServ, for example, in case of an IPv4 header, 8 bits of the TOS (Type-Of-Service) field are used to divide traffic into a number of classes, so as to perform QoS control per class. Furthermore, in a case of IPv6, 8 bits of the Traffic Class field are used.

On the other hand, routing control is dependent upon a routing protocol such as OSPF (Open Shortest Path First) and the like. The OSPF (for example, referring to the Non-Patent document 2), referred to as a link-state type routing protocol, has associated routers prepare an information element called "a link state" so as to be delivered using IP multicast to all other OSPF routers. The router, upon receiving such a link state, based on the link-state information, prepares a LSDB (Link-State DataBase) indicating where other routers exist and how they are connected, so as to have a grasp of network topology. Thus, the OSPF, as a link-state type protocol, enables the router to have a grasp of network configuration within an area, so as to compute the shortest route.

Also, as a method of routing control for implementing the QoS, there is a multi-path routing method in which, with an objective of transferring traffic according to class, multiple routes (multi-paths) are used according to the class. For example, TOS routing, which refers to the values in the TOS field as well as to the point of destination, is described in a previous OSPF (referring to the Non-Patent Document 3); however, it is omitted at the present.

Non-Patent Document 1

(RFC 2475) "An Architecture for Differential Services", http://www.ietf.org/rfc/rfc2475.txt Non-Patent Document 2

(RFC 2328) "OSPF Version 2", http://www.ietf.org/rfc/rfc2328.txt

Non-Patent Document 3

(RFC 1583) "OSPF Version 2", http://www.ietf.org/rfc/rfc1583.txt

As described above, as a technology for providing QoS according to requirements for quality of service, there exists technologies such as DiffServ for implementing bandwidth control for QoS by a control such as queuing, scheduling, and the like by a router (related art "a"), and a multi-path routing technology for using multiple routes according to class so as to implement QoS according to class (related art "b").

Up to now, the method of using an IP-header field according to the router control of the related art "a" and the method of using an IP-header field according to the multi-path routing of the related art "b" have been considered independently. When the related art "a" and the related art "b" are combined so as to be used, there is a portion within the IP-header field in which bit positions referred to by the respective methods as described above overlap so as to interfere with each other.

A problem arises such that when bits in a field within an IP-header, referred to by the respective methods, mutually interfere, the correlation between a router-control class and a multi-path routing class may not be changed freely. For example, when traffic is divided according to class, there may not necessarily be a one-to-one relationship between the router control class and the multi-path routing class. In other words, it is quite possible that multiple router-control classes are carried as one multi-path routing class, or even that one router-control class is divided into multiple multi-path routing classes so as to be carried as the multiple routing classes.

Furthermore, when a router-control class causes a change of transfer route, if a desired route exists at another multi-path routing class, it is preferable to change only the corresponding relationship to such multi-path routing class.

Thus when the bits referred to by the router control and the bits referred to by multi-path routing within an IP-header field interfere with each other, such mutual interfering between the router-control and multi-path routing classes makes it difficult to have flexibility in the relationship between the classes.

FIG. 14 is a diagram for illustrating such problems as described above using both the router control according to the related art "a" and the multi-path routing according to the related art "b". In FIG. 14, routers configuring an IP network are represented as letters R1 through R4.

When combining DiffServ and TOS routing as in FIG. 14, in the DiffServ the first six bits of Type of Service field (TOS) are used as DSCP (DiffServ Code Point) (referring to FIG. 15A), while in the TOS routing the fourth through the seventh bits of the TOS field of an IPv4 header are used on a fixed basis (referring to FIG. 15B). For example, when bit sequence within the TOS field of the Ipv4 header is "00111100", the 6 bits of "001111" represent a class of the DiffServ, while the 4 bits of "1110" represent a class of the TOS routing. In other words, the bit positions for the class of the DiffServ and bit positions for the class of the TOS routing have partially overlapping portions as represented by the fourth through the sixth bits.

Returning to FIG. 14, as in a first case, when a class represented as "001111 (DSCP)" of the DiffServ is transferred via a default route, it can be dealt with by a default route entry, but in a case where the transfer is made via a route other than the default route, it becomes necessary for the TOS routing to separately enter in a table the route represented as "*1110*".

Furthermore, as in a second case of FIG. 14, even when trying to transfer a class of "111110 (DSCP)" of the DiffServ via the same route as "*1110*" of the TOS routing, a separate entry of "***1100" of the TOS routing is needed, requiring an independent calculation. In other words, even when passing through the same route a TOS class is required per DSCP.

Furthermore, the DiffServ class is not able to set the corresponding TOS-routing class to be changed. For example, as in a third case of FIG. 14, even if an attempt is made to send DSCP:001111 via a TOS:1000 route, a TOS:1110 route must be recalculated.

Thus, with the TOS routing and the DiffServ, as the bits referred to by the respective methods end up interfering with each other, changing a relationship between a DSCP and a routing class requires the DSCP value and the routing class value themselves to be changed. In other words, the DiffServ class and the TOS-routing class are not enabled to freely change the respective bits as described above.

Furthermore, for a DSCP to change route, there is no other way but to adjust the corresponding TOS cost (mainly determined by the bandwidth of the interface) so as to, by recalculation, change the route, resulting in a transitional burden on a router and a link.

Furthermore, even when multiple DSCP's pass through one route, if the respective TOS parts differ, as the same table cannot be referred to for the TOS routing, multiple entries must be stored for the one route as described above.

As these problems as described above occur not only in the case of the TOS routing, but also in other multi-path routing cases, combining the router control and the router routing so as to implement the QoS becomes difficult.

SUMMARY OF THE INVENTION

It is a general object of the present invention to provide an IP network that substantially obviates one or more problems caused by the limitations and disadvantages of the related art.

In light of the problems as described above, it is a more particular object of the present invention to provide a method of controlling Quality-of-Service (QoS) in an IP network with a simultaneous and combined use of a QoS method using router control and a QoS method using multi-path control, so as to enable a more practicable QoS.

According to the invention, a QoS controller in an IP network having one or more routers includes a storing unit configured to assign a first bit area and a second bit area within a field in an IP header of an IP packet, and store first bits for controlling the routers into the first bit area and second bits for routing at the routers into the second bit area, and a reporting unit configured to report to the routers the first bits and the second bits stored by the storing unit.

The QOS controller in an embodiment of the invention enables a simultaneous and combined use of a QoS method using router control and a QoS method using multi-path control so as to implement a more practicable QoS.

According to another aspect of the invention, a method of controlling QoS in an IP network having one or more routers includes the steps of, assigning within a field in an IP header of an IP packet a first bit area and a second bit area, storing first bits for controlling the routers into the first bit area and second bits for routing at the routers into the second bit area, reporting to the routers the first bits and the second bits stored, and causing, according to the reporting, the routers to start controlling and routing at the routers based on the first bits and the second bits stored.

The method of controlling QOS in an embodiment of the invention enables simultaneous and combined use of a QoS method using router control and a QoS method using multi-path control so as to implement a more practicable QoS.

According to another aspect of the invention, a router in an IP network includes a control and relay unit configured to control the router and route at the router in accordance with first bits for controlling the router, stored in a first area assigned within an IP-header field of an IP packet, and second bits for routing at said router, stored in a second area also assigned within said IP-header field of the IP packet.

The router in an embodiment of the invention enables simultaneous and combined use of a QoS method using router control and a QoS method using multi-path control so as to implement a more practicable QoS.

Other objects and further features of the present invention will be apparent from the following detailed description when read in conjunction with the accompanying drawings.

BRIEF DESCRIPTION OF THE DRAWINGS

FIG. 14 is a diagram for describing a problem as described above in a case of using together router control according to related art "a" and multi-path routing according to related art "b";

DETAILED DESCRIPTION OF PREFERRED EMBODIMENTS

In the following, embodiments of the present invention are described with reference to the accompanying drawings.

Figure 1:
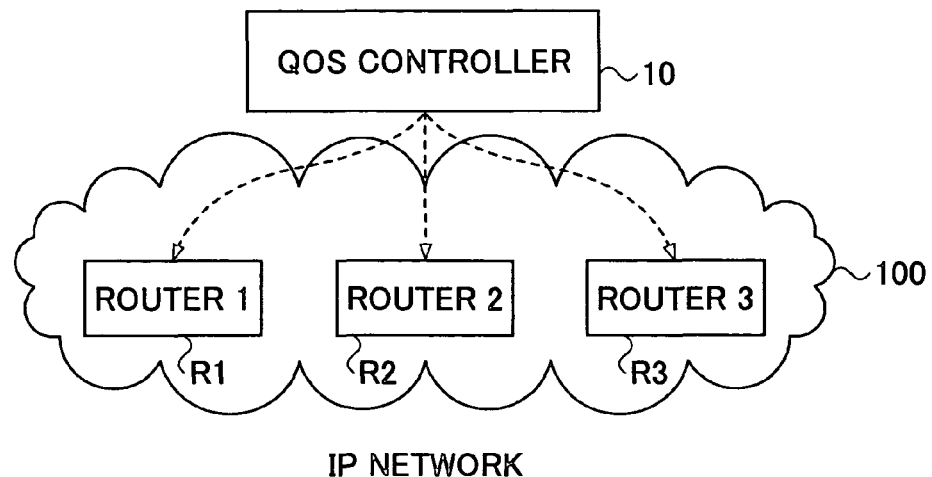
FIG. 1 is an example of a configuration of a Quality-of-Service (QoS) control system in an IP network, in which a method of controlling the QoS according to an embodiment of the present invention is applied.

A Quality-of-Service (QoS) control system in an IP (Internet Protocol) network, in which a method of controlling the QoS according to an embodiment of the present invention is applied, may be configured as illustrated in FIG. 1, for example.

In FIG. 1, the QoS control system has a QoS controller 10 which is configured by a computer, and routers R1 through R3 which configure an IP network 100. Herein, for brevity, it is assumed that the IP network 100 has only three routers R1 through R3.

Figure 2:
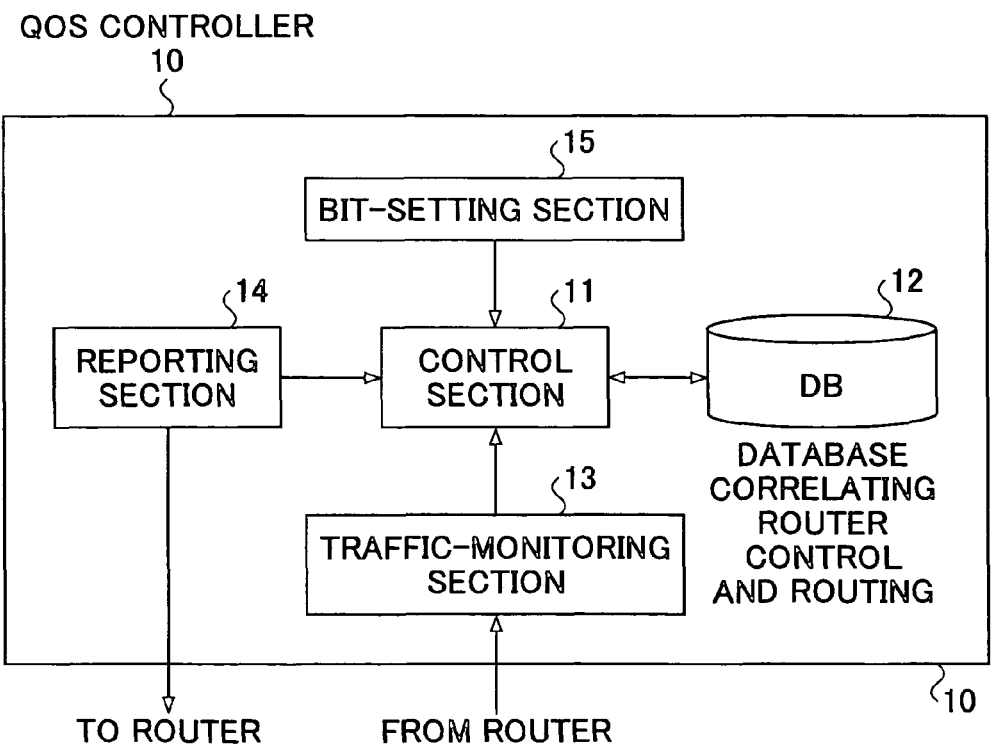
FIG. 2 is a functional block diagram of a QoS controller illustrated in FIG. 1.

A functional block diagram of the QoS controller 10 as described above may be configured, for example, as illustrated in FIG. 2.

In FIG. 2, the QoS controller 10 has a control section 11, a database (DB) correlating router control and routing 12, a traffic-monitoring section 13, a reporting section 14, and a bit-setting section 15.

As the routers (R1 through R3) as described above basically have the same configurations, herein, an overview of the configuration is provided, using the router R1 as an example.

Figure 3:
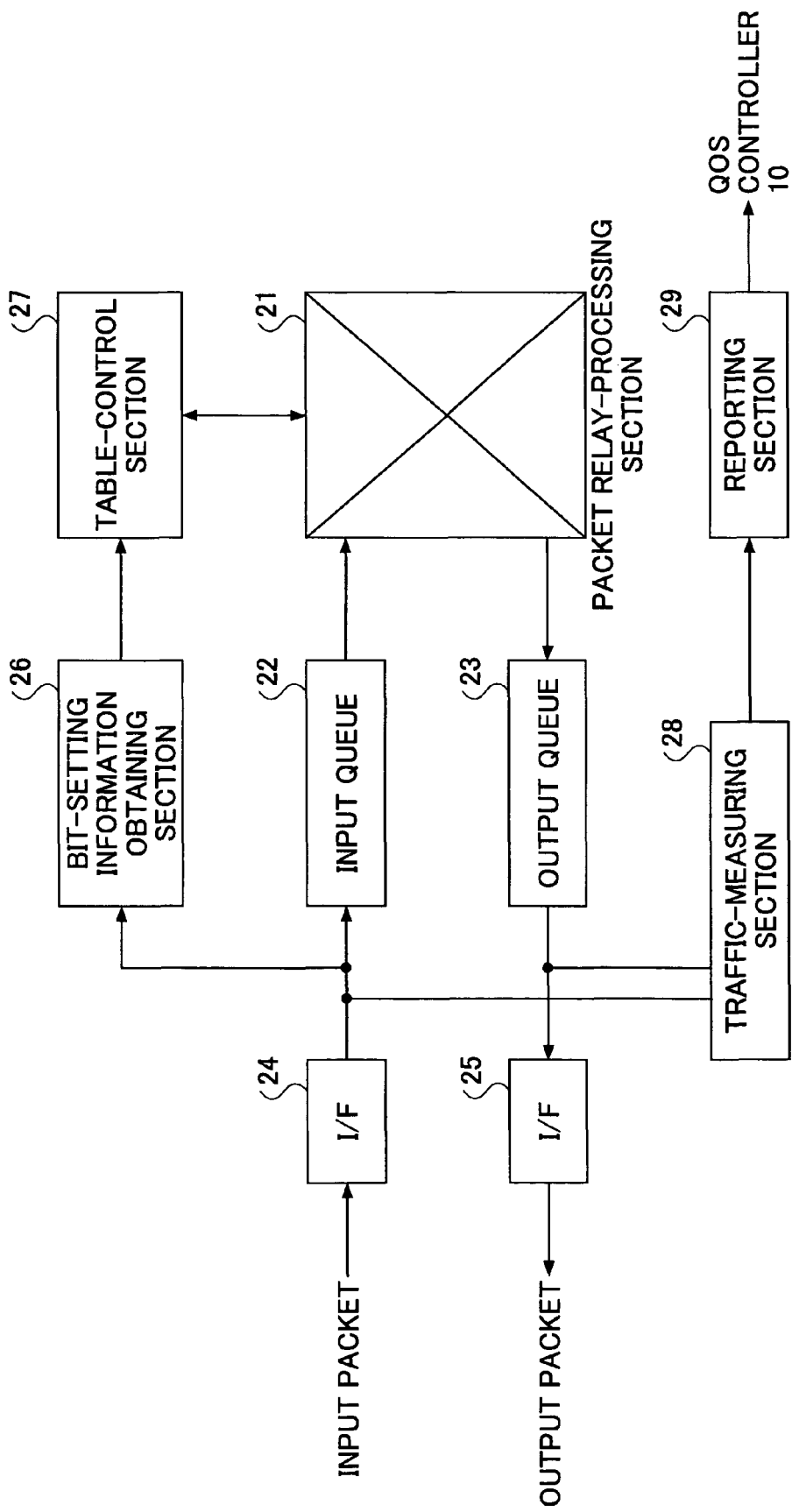
FIG. 3 is a functional block diagram of a router illustrated in FIG. 1.

FIG. 3 is a functional block diagram of the router R1.

In FIG. 3, the router R1 has a packet relay-processing section 21, an input queue 22, an output queue 23, an input interface (I/F) 24, an output interface (I/F) 25, a bit-setting information-obtaining section 26, a table-control section 27, a traffic-measuring section 28, and a reporting section 29.

Next, an overview of operations of the QOS controller 10 configured as described above is provided.

As a storing unit, the bit-setting section 15 of the QoS controller 10, based on number of classes and number of routes used in the IP network 100, sets at an arbitrary field within an IP header bits for use in router control and bits for use in routing at the router so as not to interfere with each other.

Figure 4:
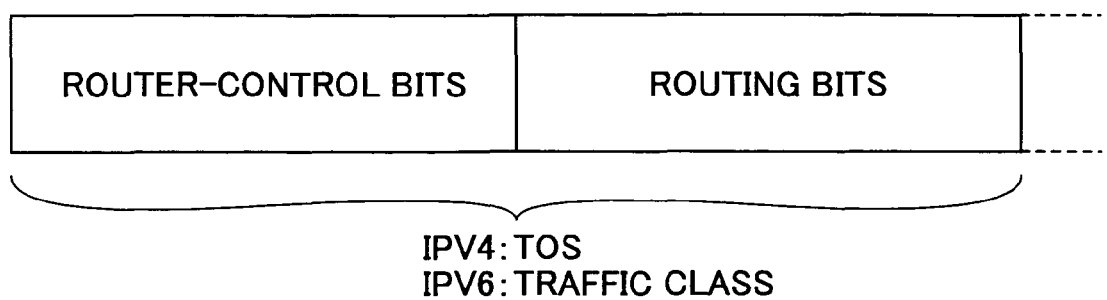
FIG. 4 is a data diagram defining an IP-header field according to an embodiment of the present invention.

For example, as illustrated in FIG. 4, a field in an IP header is divided so as to set bits for use in router control (router-control bits) and bits for use in multi-path routing (routing bits). Herein, with an IPv4 header, the first 4 bits of the Type-of-Service field are assigned as an area for the router-control bits, while the last 4 bits are assigned as an area for the routing bits. Moreover, with an IPv6 header, the first 4 bits of Traffic Class field are assigned as the area for router-control bits, while the last 4 bits are assigned as the area for the routing bits.

A description is provided below, assuming that, in the present embodiment, the router-control bits and the routing bits as described above are set in the Type-of-Service field of the Ipv4 header.

The router-control and routing bits information set at the bit-setting section 15 in the QoS controller 10, after being converted at the control section 11 to a predetermined format, is reported via the reporting section 14 to the respective routers R1 through R3 within the IP network 100 so that, based on the router control and routing bits information set received from the QoS controller 10, the routers R1 through R3 are caused to start their respective operations.

Figure 5:
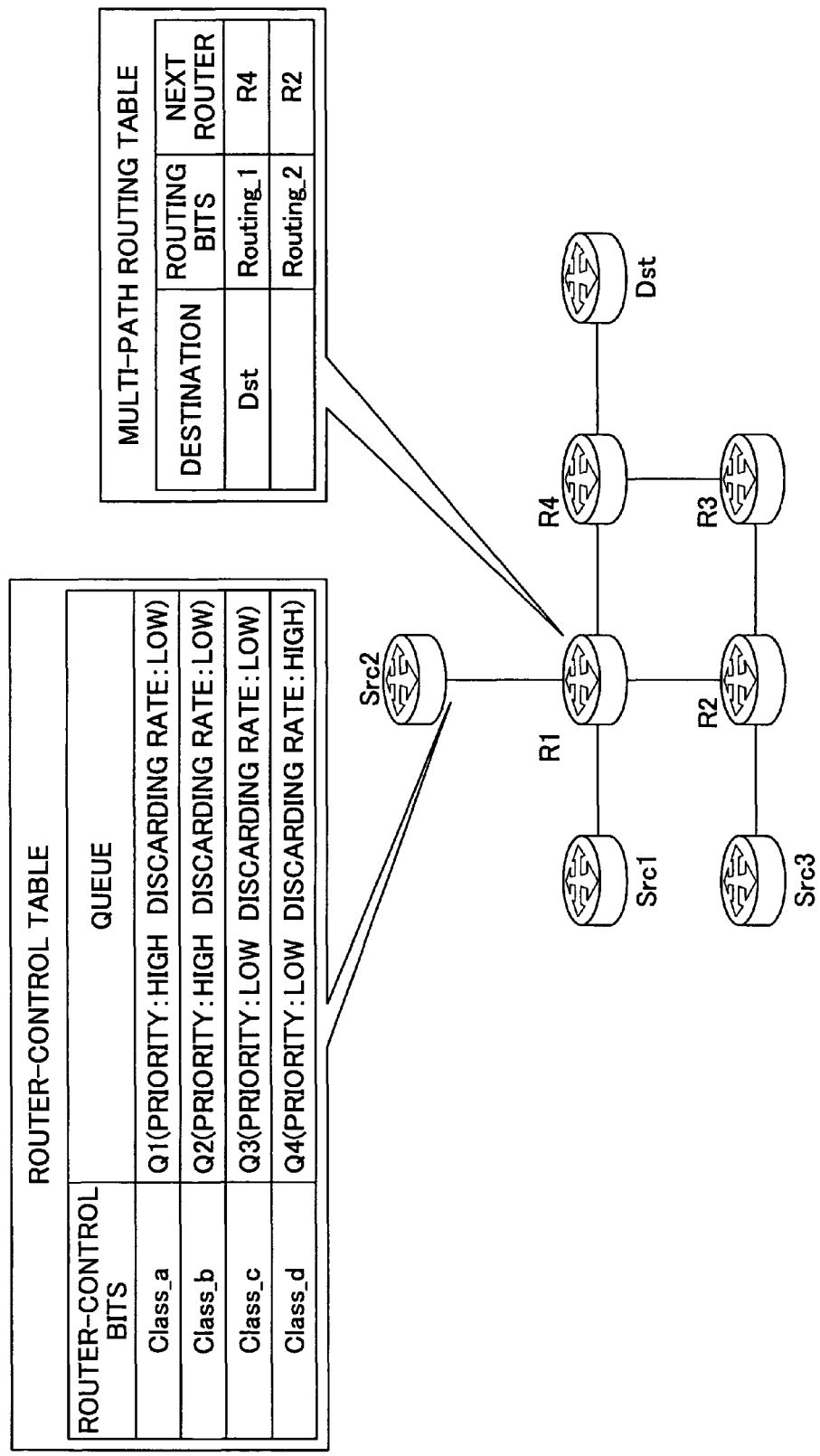
FIG. 5 is a diagram for describing router control and routing at the router.

Next, a router side operation is described, referring to FIG. 5.

FIG. 5 is a diagram illustrating an example of a group of routers which configures an IP network. In FIG. 5, a router Dst represents a destination (a target of transmission) of an IP packet (traffic), routers Src1 through Src3 represent sources of transmission (sources) of the IP packet, and routers R1 through R4 represent internal routers. Herein, first, using the router R1 as an example, an operation at the router R1 is described.

The bit-setting information-obtaining section 26 in the router R1 obtains, via the input I/F 24, the router-control and routing bits information which is reported from the QoS controller 10 so as to be output to the table-control section 27. The table-control section 27 uses the router-control bits as information for creating a router-control table and the routing bits as information for creating a multi-path routing table.

(1) Creating the Multi-Path Routing Table

The multi-path routing table is created according to a multi-path routing protocol. While, in a generally-used routing table, information (entries) having recorded network addresses to be destinations and network interfaces to be used are stored, in the multi-path routing table, entries for multiple routes are stored.

At the table-control section 27, the routing bits are set in the field represented as "routing bits" in the multi-path routing table. More specifically, the routing bits (bit sequences) corresponding to the respective multiple routes to the router Dst are set (referring to descriptions below and the routing table in FIG. 5).

| Destination | Routing bits | Next router |
|---|---|---|
| Dst | Routing_1 | R4 |
|  | Routing_2 | R2 |

Figure 6:
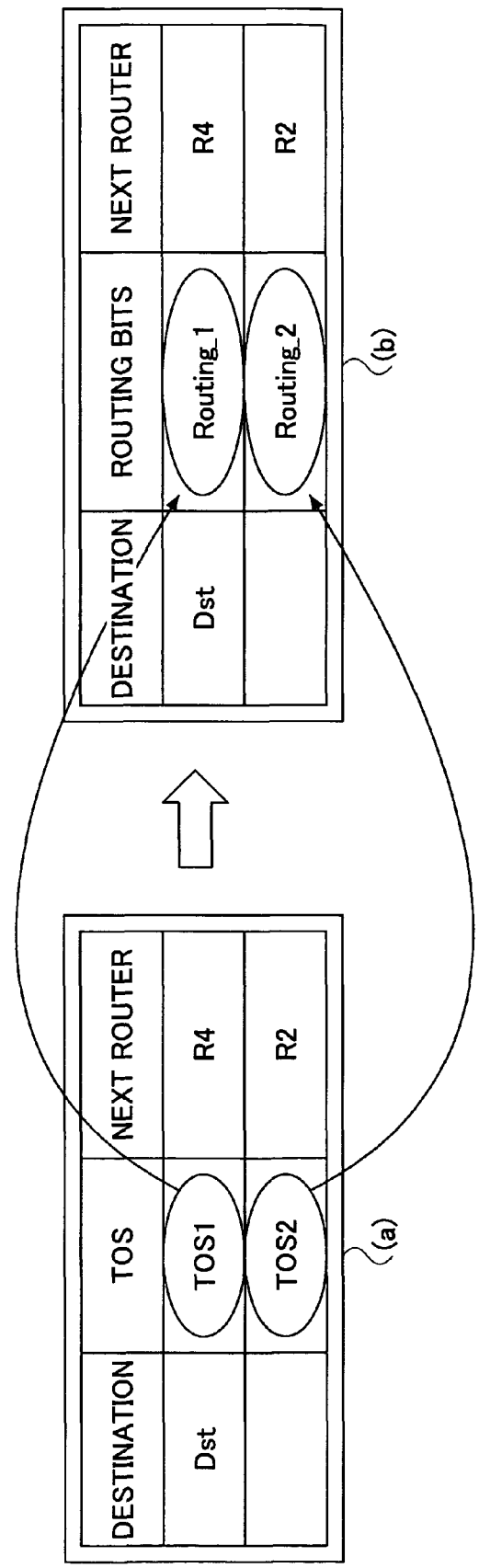
FIG. 6 is an example of setting a multi-path type so as to be represented as routing bits.

Then, in a DiffServ router, a TOS field value in an IP header is redefined so as to implement TOS routing. Thus, when using the TOS routing so as to look for multiple routes to a destination, an entry per TOS is created in the multi-path routing table as described above (Referring to section (a) of FIG. 6). However if the TOS field value as it is, is assumed as a multi-path routing class, there may be a possibility of interfering with a router-control class. Therefore, in the present embodiment, as illustrated in section (b) of FIG. 6, the routing bits are once again reset so as to correspond to the respective routing table entries created per TOS (referring to the description below).

TOS Routing bits
TOS1=>Routing_1
TOS2=>Routing_2

Furthermore, when the routing protocol itself is used as an identifier for the multiple routes, in the same field as the routing bits, the QoS controller 10 may, without setting the routing bits to correspond, use the bits used by the routing protocol as they are.

(2) Creating the Router-control Table

The table-control section 27 sets the router-control bits, received from the bit-setting information-obtaining section 26, in the field represented as "router-control bits" in the router-control table (referring to descriptions below and the router-control table in FIG. 5).

| Router-control bits | Queue |
|---|---|
| Class_a | Q1 (priority: high discarding rate: low) |
| Class_b | Q2 (priority: high discarding rate: low) |
| Class_c | Q3 (priority: low discarding rate: low) |
| Class_d | Q4 (priority: low discarding rate: high) |

Router-control classes (Class_a through Class_d) controlled using the router-control table are represented as the router-control bit sequences so that a queuing process corresponding to the priorities of the respective classes is performed. For example, in a case of Class_a, an IP packet flowing into the router is stored in a high-priority queue (Q1) within the input queue 22 and, in a case of IP packets building up being backlogged, the IP packets are discarded at a low discarding rate.

Figures 7, 8:
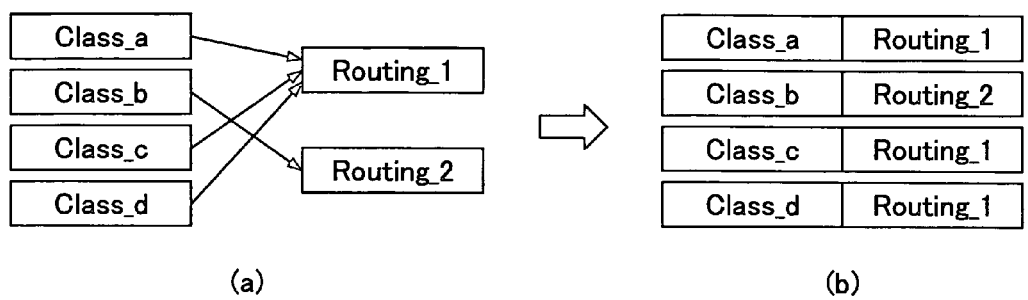
FIG. 7 is a diagram of relationships between router-control classes and multi-path routing classes.
FIG. 8 is an example of a correspondence table stored and controlled by a database correlating router control and routing 12.

As described above, according to the QoS controller 10 of the present invention, setting in a field within an IP header router-control bits and routing bits so as not to cause interference with each other enables, when multiple router-control classes as illustrated in section (a) of FIG. 7 (Class_a, Class_c, Class_d) are carried as one routing class (Routing_1) (when there is no one-to-one correspondence between a router-control class and a routing class), in a case of switching route of Class_a, only the routing bits to be switched to Routing_2 (referring to section (b) of FIG. 7). In other words, a recalculating of the route of the routing class presently corresponding is not needed.

Furthermore, in the embodiment as described above, while a case of the routers (R1 through R4, Src1 through 3, and Dst) having one common table mapping the router-control class and the routing class to the respective router-control bits and the routing bits is illustrated, the routers as described above may have different tables, for example, the router R1 having a table set to correlate Class_a (router-control class) and Routing_1 (routing class), and the router R2 having a table set to correlate Class_a and Routing_2. Thus, setting the tables to differ from one router to another enables flexible route control.

Moreover, the QoS controller 10 according to the present invention sets to correlate, in accordance with the traffic requirement, the router-control class and the multi-path routing class meeting the QoS requirement of the traffic, so as to store and manage at the database correlating router control and routing 12 a correspondence table indicating the relationship.

FIG. 8 is an example of the correspondence table stored and controlled at the database correlating router control and routing 12.

In FIG. 8, the correspondence table as described above includes a traffic type, a router-control class, and a multi-path routing class. In this example, the router-control class and the multi-path routing class corresponding to the respective traffic types are set so as to be stored, as follows:

| Traffic type | Router-control class | Multi-path routing class |
| --- | --- | --- |
| Traffic_a | Class_a | Routing_1 |
| Traffic_b | Class_b | Routing_2 |
| Traffic_c | Class_b | Routing_1 |
| Traffic_d | Class_c | Routing_1 |

Figure 9:
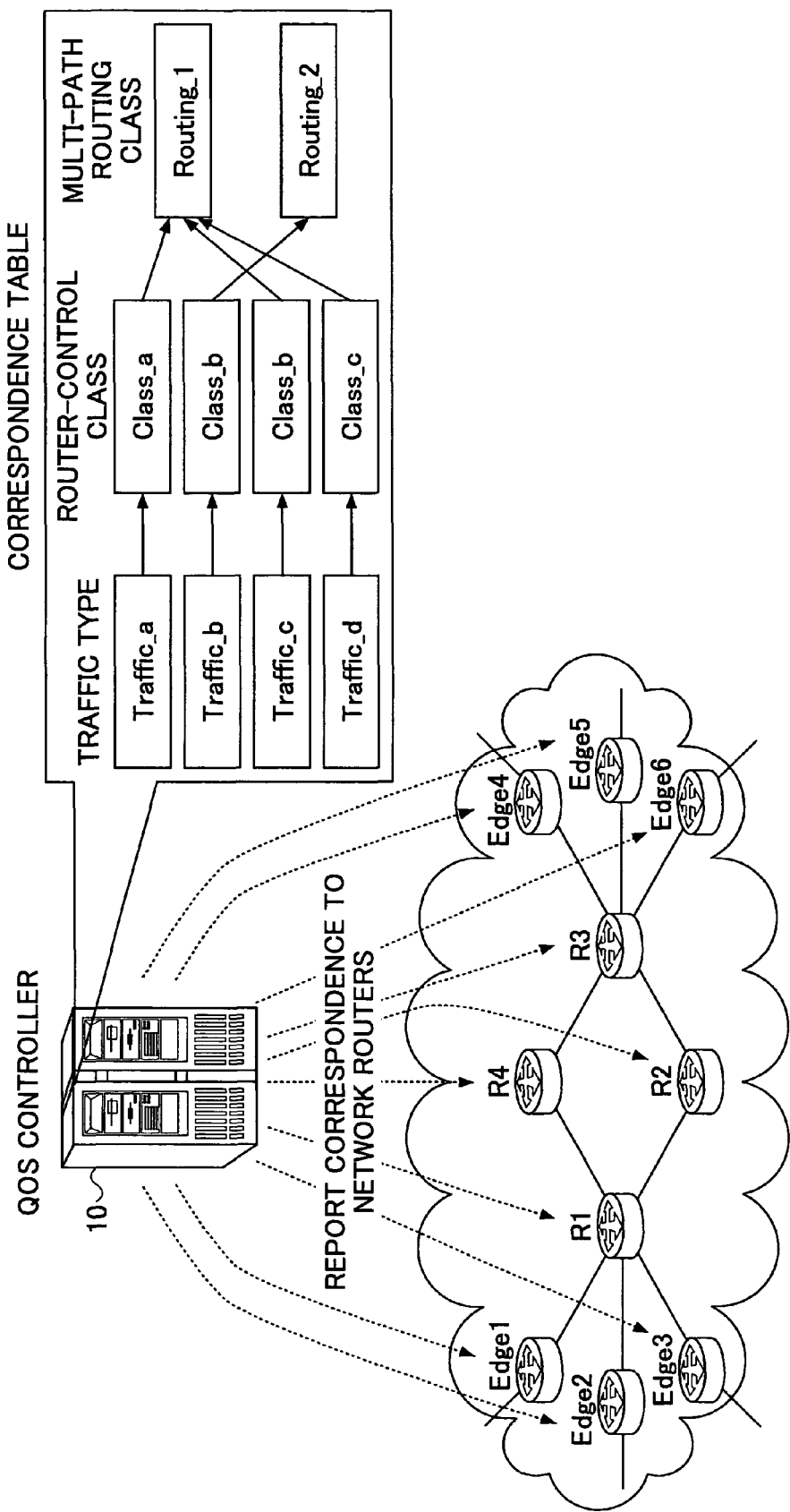
FIG. 9 is a diagram for describing a concept of managing the relationships between the classes and reporting the correspondence table to the routers by the QoS controller.

The QoS controller 10 provides the correspondence table as described above to the routers within the IP network (referring to FIG. 9). In FIG. 9, edge routers (Edges 1 through 6) are routers arranged at a boundary of an area.

Next, a process of relaying an IP packet by the edge routers (the Edges 1 through 6) is described.

Figure 10:
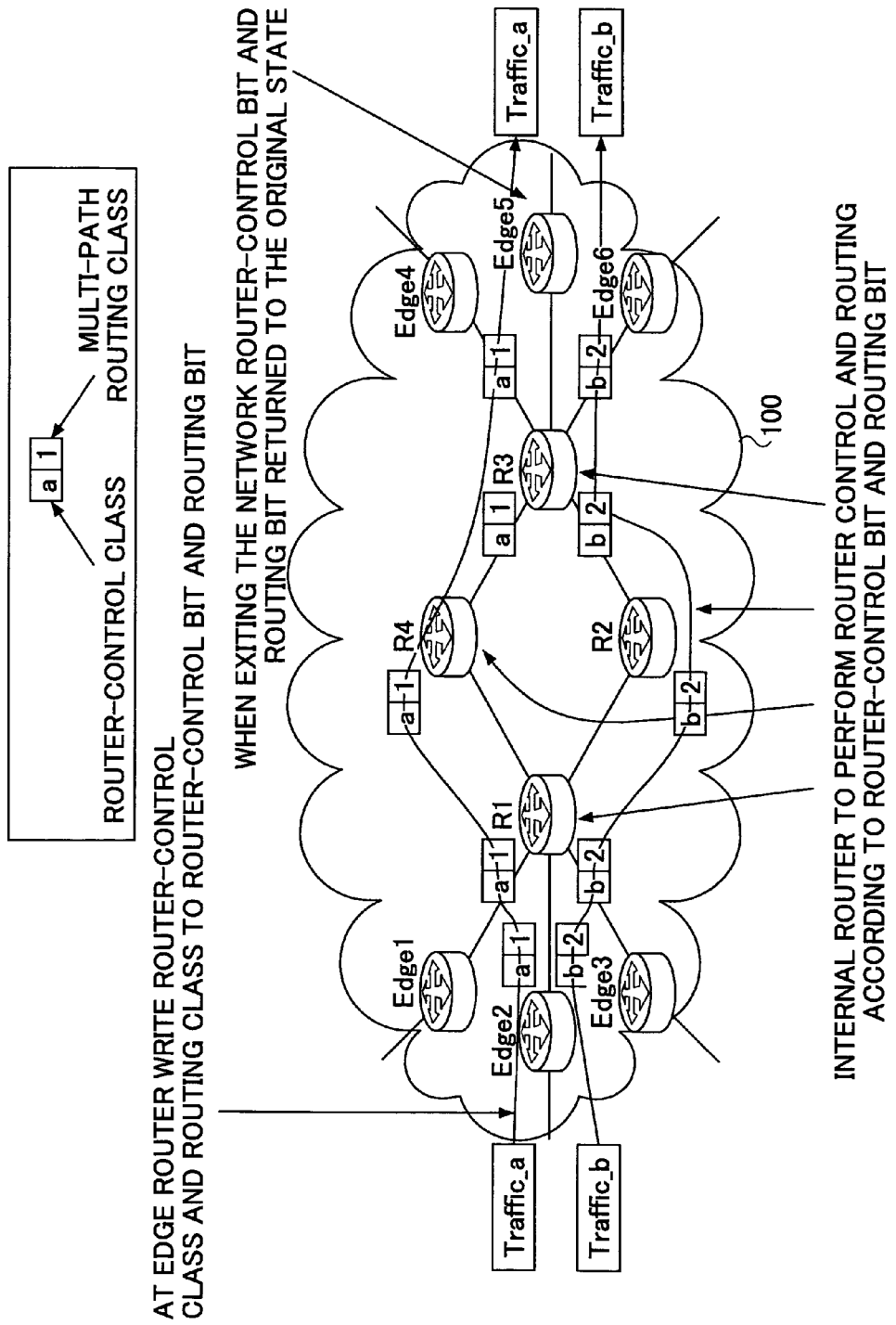
FIG. 10 is a diagram for describing a setting of router-control bits and routing bits by edge routers (Edges 1 through 6) and an example of transferring by internal routers R1 through R4.

FIG. 10 is a diagram for describing a setting of router-control bits and routing bits by the edge routers (Edges 1 through 6) and an example of transferring by internal routers R1 through R4.

In FIG. 10, when an IP packet enters an IP network, first, the IP packet is received at the edge router (Edge 2) at a gateway of the IP network. The edge router (Edge 2), according to the correspondence table reported from the QoS controller 10 (referring to FIG. 8) writes the router-control bits and the routing bits corresponding to the traffic type of the received IP packet. Herein, assuming the traffic type of the IP packet received at the edge router (Edge 2) as Traffic_a, according to the database correlating the router control and the routing 12 (referring to FIG. 8), the router-control class corresponding to Traffic_a is "Class_a" so that, at the table-control section 27, the router-control bits corresponding to "Class_a" are written into the IP header. On the other hand, according to the database correlating the router control and the routing 12 in FIG. 8, the multi-path routing class corresponding to Traffic_a is "Routing_1" so that the routing bits corresponding to Routing_1 are written in the IP header. Furthermore, at the routers other than the edge routers (at the internal routers R1 through R4), such writing into the IP header as described above is in principle not executed so that the router control and the multi-path routing according to the router-control bits and the routing bits stored in advance are performed.

When an operation of writing into the table at the edge router is performed as described above, the IP packet of the Traffic_a received at the edge router (Edge 2) is passed on via the routers R1, R4, and R3 to the edge router (Edge 5). Then, when the IP packet exits the edge router (Edge 5), the table-control section 27 at the edge router (Edge 5) reverts the router-control bits and the routing bits previously written into the IP header to the state prior to the packet entering the IP network. Furthermore, Traffic_b in FIG. 10 undergoes the same process as Traffic_a as described above.

Moreover, the QoS controller 10 according to the present invention monitors the condition of the traffic entering the router and sets the relationship between the router-control class and the multi-path routing class to change according to traffic changes.

Figure 11:
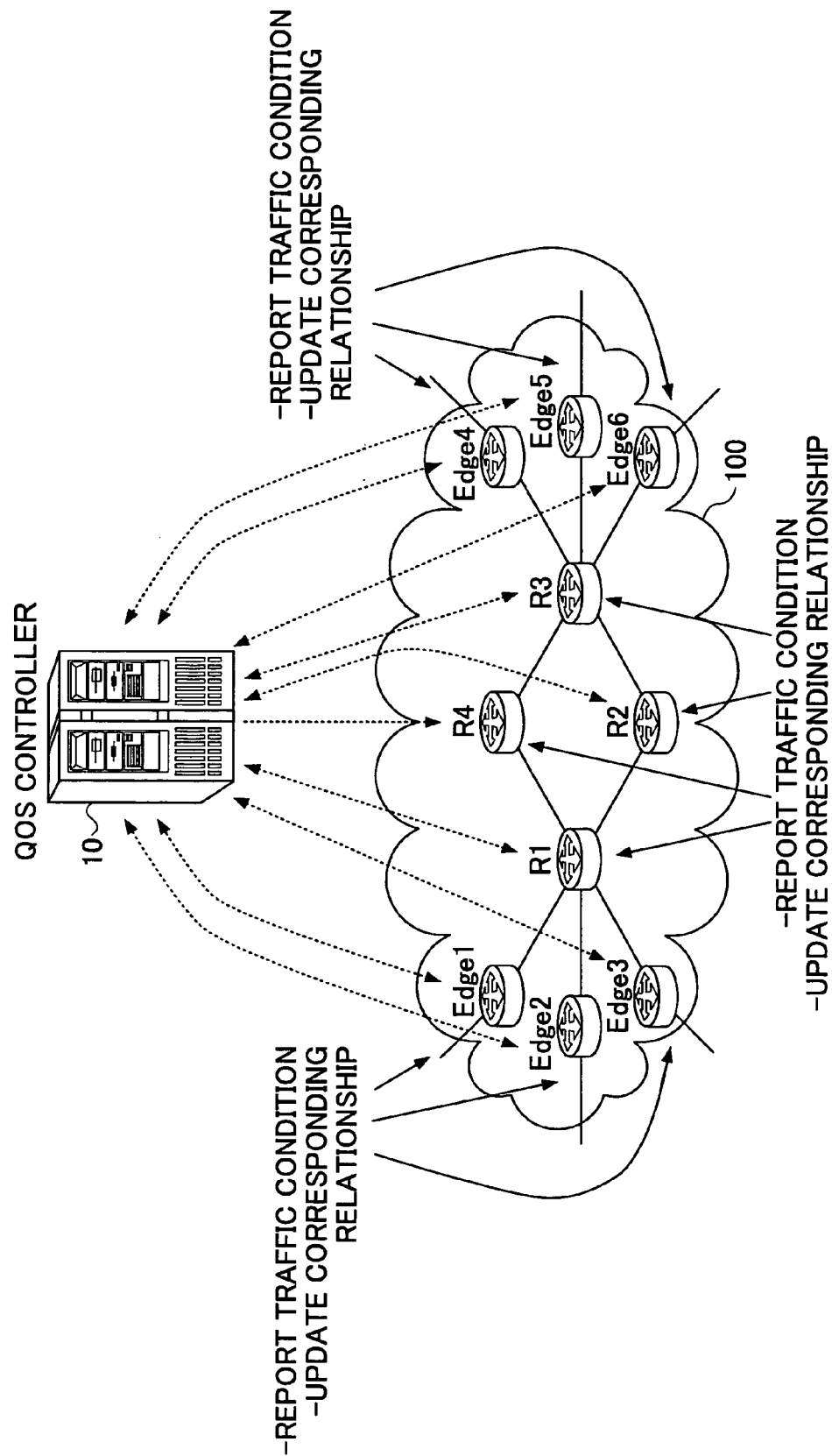
FIG. 11 is a diagram for describing updating and reporting of the relationship between a router control class and a multi-path routing class in accordance with traffic changes.

FIG. 11 is a diagram for describing an operation of performing an update and reporting the relationship between the router-control class and the routing class according to traffic changes.

In FIG. 11, the traffic-monitoring section 13 of the QoS controller 10 periodically receives a report on the traffic from each of the routers (Edge 1 through 6, R1 through R4) within the IP network. At the traffic-measuring section 28 at each of the routers (Edge 1 through 6, R1 through R4), the conditions of the flow of the input and the output packets are observed. For example, total traffic volume per unit of time and traffic volume per class are measured. Furthermore, the traffic volume unit of measure at the traffic-measuring section 28 is not limited so long as the traffic conditions may be determined, and, for example, may be a congestion condition or a usage rate of the router.

The traffic volume measured at the traffic-measuring section 28 as described above, is reported as a traffic report to the QoS controller 10 via the reporting section 28.

The traffic-control section 13 of the QoS controller 10 receives the traffic report reported from the router so as to send to the control section 11 a monitoring result based on the report. The control section 11, according to the changing condition of the traffic reported via the control section 11, accesses at a predetermined timing the database correlating the router control and the routing 12 so as to update the correspondence table of the router-control classes and the routing classes. The correspondence table thus updated is reported to the routers in the IP network so that, at the routers, the router-control class and the routing class information according to the traffic congestion condition is stored.

In the embodiment as described above, while a case of updating the relationship between the router-control class and the routing class based on the traffic volume measured at the router is described, in a case where a burst-like packet is generated in the IP network, the QoS controller 10 changes the correlation between the router-control class and the routing class as required. Herein, in a case where it is not sufficient to change only the correlation between the router-control class and the routing class, a multi-path routing protocol (for example, TOS routing) is activated once again so as to reset the route, set the routing bits, report to the router, and set the classes according to corresponding QoS's.

While the correspondence table updated at the QoS controller 10 is reported to the routers within the IP network, the process differs between the edge routers (Edge 1 through 6) and the internal routers (R1 through R4). The edge routers (Edge 1 through 6), upon receiving a new correspondence table, always perform the router control and routing at the router according to new relationships indicated in the correspondence table, while the internal routers (R1 through R4) use the router-control bit and the routing bit only when required, such as when the correlation between the router-control class and the routing class has changed and the like. Normally, router-control and routing are performed based on the value of the router-control bits and the routing bits having been set in advance, so as to perform a relay process on the IP packet.

Figure 12:
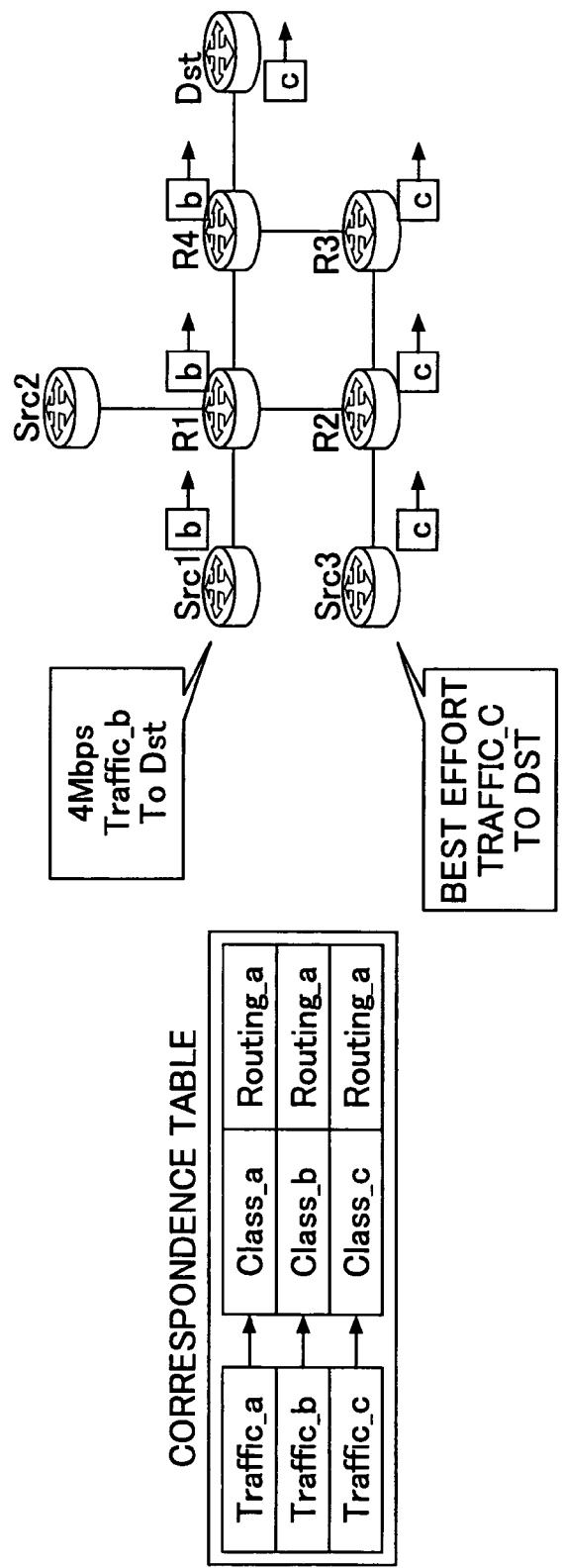
FIG. 12 is a diagram of the relationships between the router-control classes and the multi-path routing classes at a time of normal traffic.

Next, referring to FIG. 12, a correlation between the router-control class and the routing class at a time of normal traffic is described.

In the IP network in this example, three types of traffic, Traffic_a, Traffic_b, and Traffic_c, are defined, assuming the priority relationship Traffic_a>Traffic_b>Traffic_c. Moreover, it is assumed that Traffic_a and Traffic_b each have a 4-Mbps QoS requirement, while Traffic_c is a best-effort type.

Moreover, the routers configuring the IP network as described above are configured as follows:

Source routers: Src1 through Src3
Internal routers: R1 through R4
Destination router: Dst In FIG. 12, when the first 4 bits of the Type of Service field within the IP header are set as router-control bits and the last 4 bits are set as routing bits at the bit-setting section 15 of the QoS controller 10, the bit information set is reported to the routers within the IP network. As the router-control classes, there are Class_a, Class_b, and Class_c, and the routers perform priority control of outputting the IP packets in the order of Class_a>Class_b>Class_c. The routing class has multiple routes, Routing_a and Routing_b. To the router-control class and the routing class, the bit sequences of the router-control bits and the bit sequences of routing bits are respectively allocated.

At the time of normal traffic, 4-Mbps Traffic_b from Src1 and 4-Mbps Traffic_c from Src3 are sent to Dst. Under such condition, the router-control class and the routing class of Traffic_b are set as Class_b and Routing_a, respectively, while the router-control class and the routing class of Traffic_c are set as Class_c and Routing_a, respectively.

The 4-Mbps Traffic_b from Src1, via the route from R1->R4, arrives at Dst. On the other hand, 4-Mbps Traffic_c from Src3, via the route from R2->R3->R4, arrives at Dst.

Figure 13:
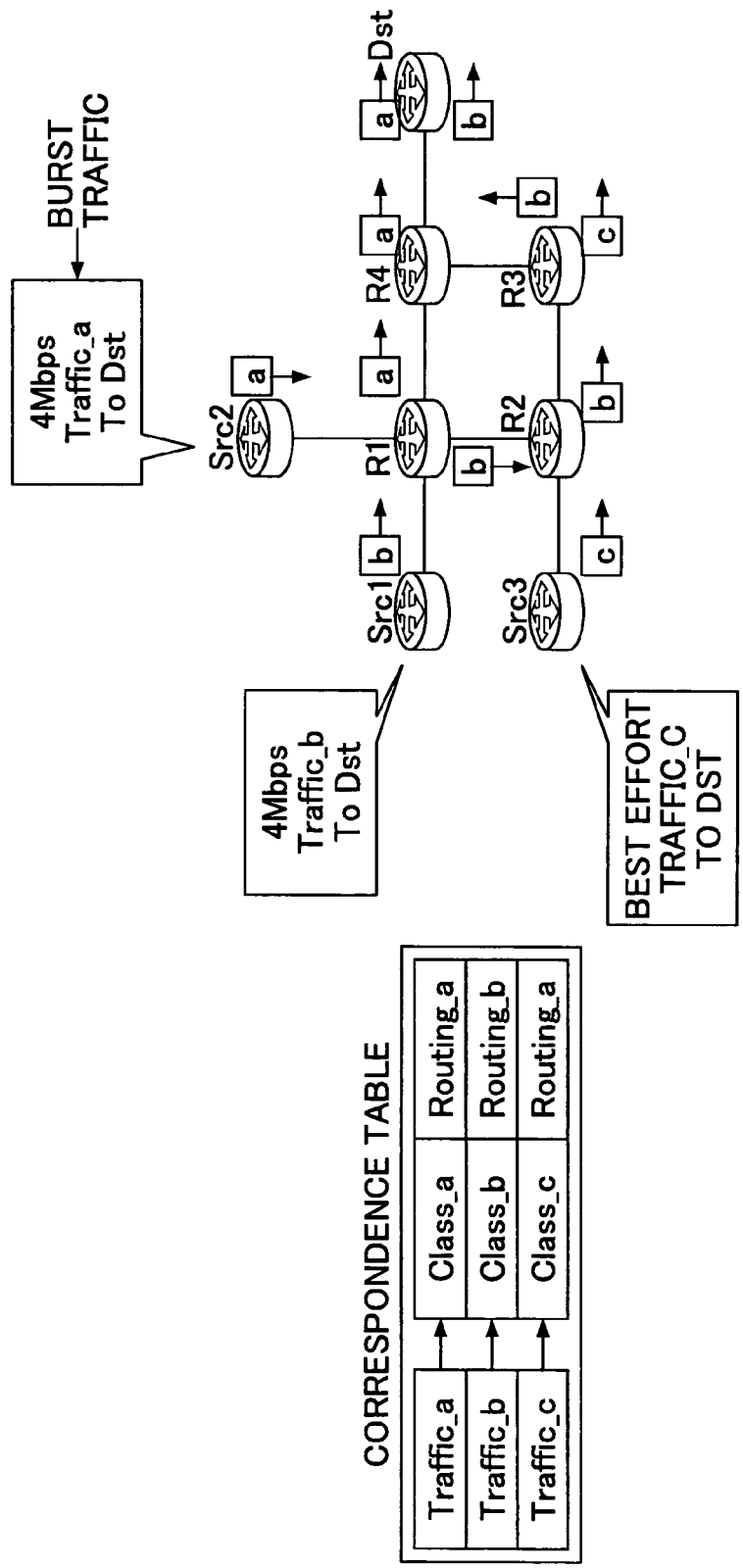
FIG. 13 is an example of the relationships between the router-control classes and the multi-path routing classes at a time of burst traffic.
Figure 15A:
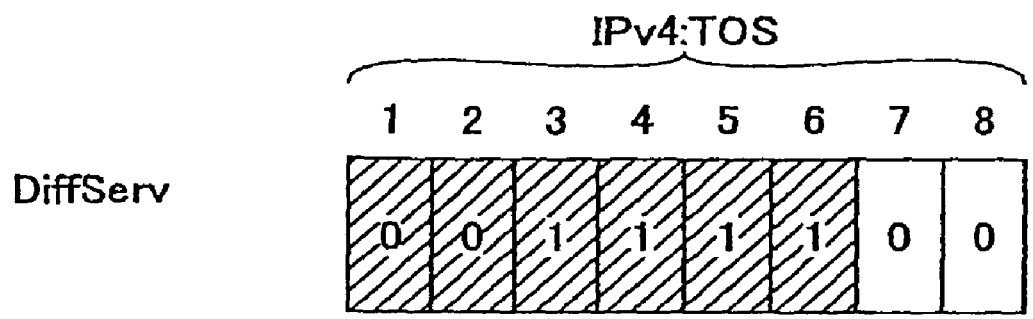
FIG. 15A is a diagram illustrating bit arrangement for a DiffServ class.
Figure 15B:
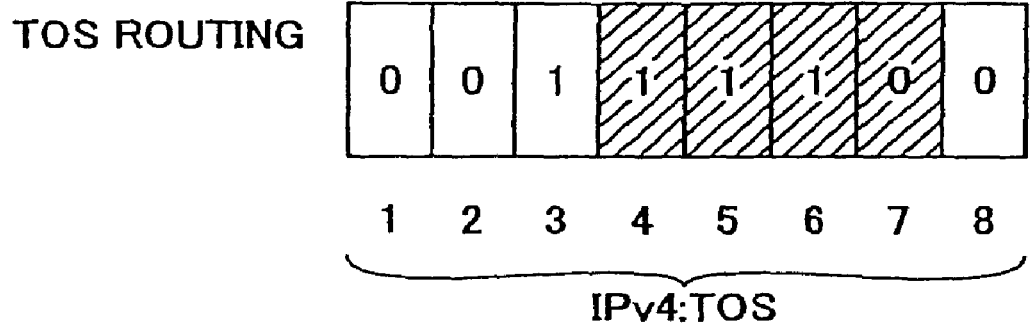
FIG. 15B is a diagram illustrating bit arrangement for a TOS-routing class.

Next, a correlation between the router-control class and the routing class at the time of burst traffic is described, referring to FIG. 13.

Herein, it is assumed that the configurations of the routers configuring the IP network, as well as the definitions and the priorities of Traffic_a through Traffic_c, are the same as in the above.

In FIG. 13, when the traffic is flowing from Src1 and Src3, in a case where 4-Mbps Traffic_a from Src2 occurs, as Traffic_a is set to correspond to Class_a and Routing_a, Traffic_a and Traffic_b merge at the router R1, resulting in inadequate bandwidth and capacity of the link (R1-R4) in a case of keeping the Routing_a routing class as it is. Therefore, a loss of a low-priority Class_b (Traffic_b) packet may result.

At the routers within the IP network, incoming traffic conditions are monitored so as to be sent to the QoS controller 10. The QoS controller 10, upon detecting the loss of the Traffic_b packet at the router R1 based on the traffic conditions received from the routers, determines that changing the routing class of Traffic_b is required so that, for example, changing the routing class of Traffic_b from Routing_a to Routing_b is performed. More specifically, the routing class corresponding to Traffic_b (Class_b) within the correspondence table stored at the database correlating the router control and the routing 12 is changed (updated). The new correspondence table thus updated is reported to the routers.

The router R1, upon receiving the new correspondence table as described above from the QoS controller 10, based on the correspondence table, changes the routing bits in the routing table. Hereby, Traffic_b having been set to correspond to Routing_b is caused to flow along a detour route in the direction of R2 so as to prevent a packet loss in the Traffic_b at the router R1.

At the router R2, Traffic_b and Traffic_c sent from Src3 merge. Although the bandwidth of the link (R2-R3) is not sufficient, the router R2 refers to the router-control bits so as to perform priority control so that the best-effort Class_c (Traffic_c) with a low priority uses the link (R2-R3) in the case of no priority traffic (Traffic_a, Traffic_b) existing.

At the router R4, Traffic_a, Traffic_b, and Traffic_c merge. Herein, in a case where the bandwidth of the link (R4-Dst) is not sufficient, the router R4 refers to the router-control bits so as to perform priority control. The best-effort traffic of Class_c (Traffic_c) with a low priority, when there is no priority traffic (Traffic_a, Traffic_b), uses the link (R4-Dst) so as to be sent to Dst.

Hereby, according to the priority relationship Class_a>Class_b>Class_c, traffic arrives at Dst in the order of 4-Mbps Traffic_a, 4-Mbps Traffic_b, and 1-Mbps Traffic_c, thus having met the priority and QoS requirements. Furthermore, when the burst traffic from Src1 disappears, the QoS controller 10 reverts to the correlation between the router-control class and the routing class as in FIG. 12 so that the correspondence table after having been reverted is reported to the routers within the IP network.

Thus, as described above, according to the present embodiment, the QoS controller 10 setting within the IP header the router-control bits for router control such as queuing and scheduling and the routing bits for routing at the router so as not to cause interference with each other, enables using together simultaneously the QoS method according to the router control and the QoS method according to multi-path routing so as to implement a more practicable QoS.

(Variations)

The present invention is not limited to the embodiments as described above, enabling different variations.

(1) Although the embodiment as described above defines the first 4 bits of a field (a TOS field or a Traffic-Class field) within an IP header as router-control bits and the last 4 bits as routing bits so as to allocate the field, the invention is not be limited to such method of dividing. For example, the number of router-control bits and the number of routing bits may be set at any of the proportions as follows:

| Number of router-control bits | Number of routing bits |
|---|---|
| 7 | 1 |
| 6 | 2 |
| 5 | 3 |
| 4 | 4 |
| 3 | 5 |
| 2 | 6 |
| 1 | 7 |

Moreover, the setting of the router-control bits and the routing bits may be performed by using an arbitrary field within an IP header as well as the TOS field in IPv4 or the Traffic Class field in IPv6.

(2) Moreover, although in the embodiment as described above, the TOS field within the IP header is defined as the router-control bits and the routing bits uniformly in the IP network, the present invention is not limited to such method of defining as described above. For example, it may take a form such that the Flow Label field in an Ipv6 header is defined as the router-control bits and the routing bits, or a setting of the router-control bits and the routing bits is changed per traffic type.

The present application is based on Japanese Priority Patent Application No. 2003-081364 filed Mar. 24, 2003, with the Japanese Patent Office, the entire contents of which are hereby incorporated by reference.

What is claimed is:

1. A QoS controller, in an IP network having one or more routers, the QoS controller being different from the one or more routers of the IP network and comprising:
   a storing unit configured to assign a first bit area and a second bit area within a field in an IP header of an IP packet, and store first bits for implementing bandwidth control at said routers into said first bit area and second bits that indicate a path for routing the IP packet to a destination router into said second bit area, wherein said first bits and said second bits do not interfere with each other within the field in the IP header;
   a reporting unit configured to report to said routers said first bits and said second bits stored by said storing unit;
   a database unit, said database unit representing a first bit sequence as a router-control class for controlling said routers, and a second bit sequence as a routing class for routing at said routers, and said database unit storing, in accordance with a type of the IP packet, a relationship between said router-control class and said routing class;
   a traffic-monitoring unit configured to monitor traffic conditions at said routers;
   a corresponding-relationship updating unit configured to change the relationship, stored at said database unit, between said router-control class and said routing class, based on said monitored traffic conditions, wherein
   said reporting unit reports to said routers the relationship, stored at said database unit, between said router-control class and said routing class, and
   said reporting unit reports to said routers the relationship changed by said corresponding-relationship updating unit.

2. A QoS controller, in an IP network having one or more routers, the QoS controller being different from the one or more routers of the IP network and comprising:
   a storing unit configured to assign a first bit area and a second bit area within a field in an IP header of an IP packet, and store first bits for implementing bandwidth control at said routers into said first bit area and second bits that indicate a path for routing the IP packet to a destination router into said second bit area, wherein said first bits and said second bits do not interfere with each other within the field in the IP header;
   a reporting unit configured to report to said routers said first bits and said second bits stored by said storing unit; and
   a database unit, wherein
   said database unit represents a first bit sequence as a router-control class for controlling said routers, and a second bit sequence as a routing class for routing at said routers, and stores, in accordance with a type of the IP packet, a relationship between said router-control class and said routing class,
   said reporting unit reports to said routers the relationship, stored at said database unit, between said router-control class and said routing class, and
   said database unit stores a first relationship between said router-control class and said routing class for controlling a first one of said routers and stores a second relationship between said router-control class and said routing class for controlling a second one of said routers.

3. A method of controlling QoS in an IP network having one or more routers, comprising the steps of:
   assigning, by a QoS controller that is different from the one or more routers of the IP network, within a field in an IP header of an IP packet, a first bit area and a second bit area, wherein said first bit area and said second bit area do not interfere with each other within the field in the IP header;
   storing first bits for implementing bandwidth control at said routers into said first bit area, and storing second bits that indicate a path for routing the IP packet to a destination router at said routers into said second bit area;
   reporting to said routers said first bits and said second bits stored;
   causing, according to said reporting, said routers to start controlling and routing at said routers based on said reported first bits and said reported second bits stored;
   storing, by the QoS controller, a first bit sequence as a router-control class for controlling said routers, and a second bit sequence as a routing class for routing at said routers in correspondence according to a type of the IP packet;
   reporting, to said routers, the correspondence between said router-control class and said routing class;
   monitoring traffic conditions at said routers;
   updating the correspondence between said router-control class and said routing class based on said monitored traffic conditions; and
   reporting, to said routers, the updated correspondence between said router-control class and said routing class.

* * * * *